(12) United States Patent
Simske et al.

(10) Patent No.: US 7,676,038 B2
(45) Date of Patent: Mar. 9, 2010

(54) SECURE PRINTING METHOD TO THWART COUNTERFEITING

(75) Inventors: Steven J. Simske, Ft. Collins, CO (US); David E. Auter, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1401 days.

(21) Appl. No.: 11/076,534

(22) Filed: Mar. 8, 2005

(65) Prior Publication Data

US 2006/0202470 A1    Sep. 14, 2006

(51) Int. Cl.
*B42D 15/00* (2006.01)

(52) U.S. Cl. ............................. 380/55; 283/72; 382/112

(58) Field of Classification Search .................. 380/54, 380/55; 283/72; 382/112, 135, 137
See application file for complete search history.

(56) References Cited

U.S. PATENT DOCUMENTS

| | | | |
|---|---|---|---|
| 4,856,820 A | 8/1989 | Kasprzak | |
| 4,896,029 A | 1/1990 | Chandler et al. | |
| 4,924,078 A | 5/1990 | Sant' Anselmo et al. | |
| 5,288,986 A | 2/1994 | Pine et al. | |
| 5,296,693 A | 3/1994 | Hughes-Hartogs | |
| 5,449,200 A * | 9/1995 | Andric et al. | 283/67 |
| 5,464,974 A | 11/1995 | Priddy et al. | |
| 5,726,435 A | 3/1998 | Hara et al. | |
| 5,904,375 A | 5/1999 | Brugada | |
| 6,030,657 A | 2/2000 | Butland et al. | |
| 6,070,805 A | 6/2000 | Kaufman et al. | |
| 6,141,441 A | 10/2000 | Cass et al. | |
| 6,214,766 B1 | 4/2001 | Kurrie | |
| 6,402,986 B1 | 6/2002 | Jones, II et al. | |
| 6,606,396 B1 | 8/2003 | Isibashi et al. | |
| 6,678,412 B1 | 1/2004 | Shigekusa et al. | |
| 6,701,304 B2 | 3/2004 | Leon | |
| 6,706,314 B2 | 3/2004 | Butland | |
| 6,776,340 B2 | 8/2004 | Murokh et al. | |
| 6,793,138 B2 | 9/2004 | Saito | |

FOREIGN PATENT DOCUMENTS

| | | |
|---|---|---|
| EP | 0989527 | 3/2000 |
| EP | 1443452 | 4/2004 |
| WO | WO99/12742 | 3/1999 |
| WO | WO 01/80169 | 10/2001 |
| WO | WO 2004089640 | 10/2004 |

OTHER PUBLICATIONS

International Search Report and Written Opinion of the International Searching Authority dated Jul. 18, 2006.

* cited by examiner

*Primary Examiner*—Gilberto Barron, Jr.
*Assistant Examiner*—Devin Almeida

(57) ABSTRACT

A method for authenticating a target item with a security code is provided. The method includes the steps of determining a first content of security information to be coded, determining a second content of security information to be coded, printing a plurality of color tiles on a target item where the plurality of color tiles define the first content of security information, and printing one or more micro-markings on one or more of the color tiles located on the target item. The one or more micro-markings define the second content of security information.

24 Claims, 1 Drawing Sheet

SECURE PRINTING METHOD TO THWART COUNTERFEITING

FIELD OF THE INVENTION

The present invention relates generally to secure printing technologies. More particularly, the present invention relates to secure printing technologies to thwart counterfeiting activities.

BACKGROUND OF THE INVENTION

Product counterfeiting is a problem of enormous proportions throughout most of the industrialized world. In many cases, products that appear to be branded by a particular company are in fact counterfeited imitations. Brands that appear on products serve to provide consumers with information regarding the source of the goods in question. Subsequently, consumers develop preferences for particular brands, which often may include a level of trust in the source of the products. Counterfeiters take advantage of this preference and trust to pass off what are often inferior goods, causing harm to both the manufacturer and the consumer. Manufacturers lose revenue from lost sales and any goodwill harm that occurs, and they often must repair and replace counterfeited items. In some cases, manufacturers may even be legally responsible for such goods. Consumers lose value due to inferior products that may potentially cause harm through defects. For example, counterfeited parts for planes and cars have been known to contain defects that have caused serious injury or death.

As another example, the pharmaceutical industry generates many billions of dollars in the United States each year. Given such a lucrative market, it is not surprising that counterfeiting of pharmaceuticals has become a widespread and rapidly growing problem. Several factors appear to contribute to this alarming growth of criminal activity, including the increased involvement of under-regulated wholesalers and repackagers in the drug supply chain; the recent growth of internet pharmacies; and the increased international importation of pharmaceuticals. As such, consumers of pharmaceuticals may be unaware that the drugs they are taking may not have been manufactured and packaged as indicated on the pharmaceutical packaging.

Such counterfeiting practices not only reduce income to pharmaceutical companies, but they also introduce potential health risks to the consumers of the drugs in question. The strict regulation process imposed on pharmaceutical companies by the FDA helps to ensure the quality and safety of a drug. Consumers purchasing imported counterfeit drugs may believe they are taking a pharmaceutical medicine that has been manufactured and distributed according to these strict FDA guidelines and thus be effective and safe, when in fact the drug may be ineffective or may cause potentially dangerous side-effects. Also, when health risks come to fruition in these cases, consumers have no recourse or remedy due to the illicit nature of parties providing the counterfeits.

One significant technological development that has contributed significantly to the rapid spread of most forms of product counterfeiting is the widespread availability of high quality, relatively inexpensive scanners, photo printers, and image editing software. It takes little skill for a counterfeiter to scan a product label, edit the resulting image to suit a particular need, and print a supply of counterfeit labels.

Numerous factors may help to reduce product counterfeiting. Efficient methods of tracking and tracing a product from its source of origin to its destination are helpful. In such a system, counterfeit items can easily be spotted and removed from the distribution chain. Also, efficient methods of authentication by the end user or distributor of the product would assist in the elimination of counterfeit products.

As such, it would be beneficial to provide a method for increasing the difficulty of producing counterfeited products, especially for those criminals that lack a high level of technological expertise. Additionally, by increasing the level of counterfeiting difficulty, it is hoped that even highly skilled criminals will lack the resources to create illicit merchandise.

SUMMARY OF THE INVENTION

It has been recognized that it would be advantageous to provide a method for thwarting the production of counterfeit products. Specifically, a method for authenticating a target item with a security code is provided. The method includes the steps of determining a first content of security information to be coded, determining a second content of security information to be coded, printing a plurality of color tiles on a target item where the plurality of color tiles define the first content of security information, and printing one or more micro-markings on one or more of the color tiles located on the target item. The one or more micro-markings define the second content of security information.

The method may further include establishing a key corresponding to at least one of the first content of security information and the second content of security information, where the key is configured to authenticate the target item by matching the key with at least one of either the plurality of color tiles and the one or more micro-markings. The method may also include a step of authenticating the target item by matching the key to at least one of either the plurality of color tiles and the one or more micro-markings.

Additional features and advantages of the invention will be apparent from the following detailed description which illustrates, by way of example, features of the invention.

DETAILED DESCRIPTION OF THE PREFERRED EMBODIMENT(S)

Figure 1:
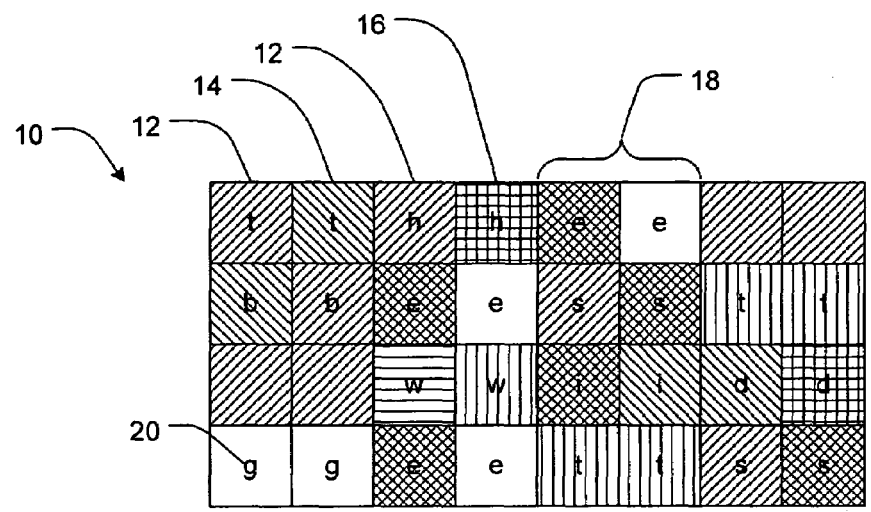
FIG. 1 is a graphical representation of a coded security marking in accordance with one embodiment of the present invention.

Before particular embodiments of the present invention are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

In describing and claiming the present invention, the following terminology will be used.

The singular forms "a," "an," and "the" include plural referents unless the context clearly dictates otherwise. Thus, for example, reference to "a variable" includes reference to one or more of such variables.

As used herein, the term "color tile" refers to a printed area of color. The area of color may be of any shape, including but not limited to, square, rectangular, circular, polygonal, irregular, etc. It is intended that the term "color" include the entire range of the visible spectrum, including traditional colors as well as shades of black, white, and gray.

As used herein, the term "micro-marking" refers to markings that are generally beyond the resolving power of 300 to 600 p.p.i. (pixels per inch) scanners. The micro-markings may be images, text, geometrical shapes, patterns, or any other markings known to one skilled in the art. Sizes often range from 1 pixel dots to an approximately 12×12 pixel region, however any size that is beyond the resolving power of 300 to 600 p.p.i. scanners would be considered to be within the scope of the present invention.

As used herein, the term "microtext" refers to a subcategory of micro-markings that comprise characters generally beyond the resolving power of 300 to 600 d.p.i. scanners. Because of their small size and typically custom fonts, these characters are difficult to recognize with an optical character recognition (OCR) system. Sizes may range from about a 4×4 pixel region to about a 12×12 pixel region.

As used herein, the term "symbol element" refers to a symbol or a character that is part of a system of communication. Symbol elements may include, but are not limited to, alphabetic characters, Asian characters, numeric characters, phonetic characters, punctuation characters, and any other symbolic communicative representation known to one skilled in the art.

As used herein, "target item" or "product" may be used interchangeably, and refer to an item that is susceptible to counterfeiting. References to printing or marking on a target item or product would include not only printing or marking on the target item, but also printing or marking on a label or other packaging material to be affixed to or encase the target item or product.

As used herein, the term "security information" can be any information utilized to provide authentication of a target item. In some cases, the security information can be in some way descriptive of the target item. It may include, for example, the name, quantity, color, barcode number, lot number, expiration date, or any other descriptive characteristic of the target item. In other cases, the security information can be unrelated to the target item. For example, the security information may be a well known or obscure phrase, or any other information that could be used to authenticate the target item. It may also be a random or seemingly random string of symbol elements.

As used herein, the term "visibly discernable" refers to one or more objects that can be visually distinguished from one another by a human or a machine. Naturally, the ability to discriminate between two objects differs between humans and machines, and therefore this term may vary depending on the authentication system being utilized.

As used herein, "secure print campaign" is any printing campaign that implements a security aspect that can be utilized to assist in authenticating a target item.

Various techniques incorporated into an anticounterfeiting campaign may help reduce the occurrence of such criminal activity. One such technique encompasses the ability to track and trace products introduced into the stream of commerce. For example, a distributor can easily pick out counterfeit items from shipments of target items that have been marked with a particular lot number, when the counterfeits lack such markings. As such, counterfeited products that have passed into legitimate supply channels can be eliminated prior to distribution to the end-user. Another technique encompasses the authentication and verification of an individual target item as an authentic product. The authentication may occur during the track and trace procedure described above, or by an end-user or other individual or machine with the proper authentication information. Through these techniques, a highly configurable coding system that allows the tracking, tracing, and authentication of a target item based on a novel pattern comprising the combination of colored tiles and microtext can be realized.

According to one aspect the present invention, a method of authenticating a target item having a security code is provided. The method may comprise the steps of determining a first content of security information to be coded, determining a second content of security information to be coded, printing a plurality of color tiles on a target item where the plurality of color tiles defines the first content of security information, and printing one or more micro-markings on the target item, such that at least one micro-marking is printed on at least one of the plurality of color tiles. The one or more micro-markings define the second content of security information.

Another aspect of the present invention further provides the method step of establishing a key corresponding to at least one of the first content of security information and the second content of security information, where the key is configured to authenticate the target item by matching the key with at least one of either the plurality of color tiles and the one or more micro-markings. Aspects of the method may also include the step of authenticating the target item by matching the key to at least one of either the plurality of color tiles and the one or more micro-markings.

The present invention can be embodied as a coded security marking, comprising a plurality of color tiles located on a target item, a first content of security information defined by the plurality of color tiles, one or more micro-markings located on the target item, such that at least one micro-marking is located on at least one of the plurality of color tiles, and a second content of security information defined by the one or more micro-markings.

The present invention can also be embodied as a method of establishing a color code for secure printing. The method can include steps of determining a desired number of symbol elements to be coded as a color code, determining a number of colors for use in the color code based on at least the number of symbol elements, calculating a minimum number of color tiles required to uniquely represent the number of symbol elements to be color coded, and selecting at least the minimum number of color tiles to establish the color code.

The security code of the present invention comprises security information coded in a combination of color tiles and micro-markings printed on at least a portion of the color tiles. As described herein, security information can include any information utilized in the security code to provide authentication of a target item. In one aspect, the security information can be descriptive of the target item. It may include any conceivable property or aspect of the target item or the packaging of the target item, including the name, quantity, color, barcode number, lot number, expiration date, or any other descriptive characteristic. This aspect can be useful because it provides a means of self-authentication. For example, if the security information that is coded comprises the barcode and expiration date of the target item, authentication could occur simply by comparing the security code to the barcode and expiration information printed on the package. In other aspects, the security information can be unrelated to the target item. For example, the security information may be a well-known or obscure phrase, or any other information that could be used to authenticate the target item. It may also be a random or seemingly random string of text.

As shown in FIG. 1, a first content of security information can be coded by the order of a series of printed color tiles 10. The color tiles are shown in this depiction as different patterns rather than different colors due to the limitation of presenting figures in black and white. It should be understood that these patterns are illustrative of different color tiles according to aspects of the present invention. The first content of security information used as an example in FIG. 1 is the text string "the best widgets." In this case, two color tiles are used to represent each letter of the text string. For example, a red color tile 12 and a blue color tile 14 can represent the letter "t" when printed together in that order. Similarly, a red color tile 12 and a green color tile 16 can represent the letter "h." The first content of security information is thus represented in the printed order of color tile pairs, exemplified as one of the pairs at 18. The number of color tiles utilized to represent each letter can vary, depending on the number of letters or characters being represented, as will be further discussed herein.

Using color to track and trace and to thwart the counterfeiting of a target item can be a very powerful and versatile technique, especially when printed using a very high quality liquid electrophotography (LEP) printer. With an LEP printer, a color tile can be printed pixel by pixel with very little variance in the color, e.g. hue, saturation, etc. Such high quality color cannot be reproduced on a consumer ink-jet printer. When color is used to authenticate the target item, counterfeiters have a very difficult time matching the correct color hues without an extremely expensive LEP printer, and thus, cannot generate the first content of security information contained therein. Additionally, the ability to produce very precise color hues with low variability eliminates the need for an analogue statistical determination in the authentication of color hue, but rather allows for a digital color authentication system.

Micro-markings in the form of microtext 20 can also be printed on the color tiles 10. In FIG. 1, the microtext characters shown correspond to the letter of the first content of security information represented by the underlying color tile pair, exemplified at 18. The printed order of the microtext characters corresponds to the second content of security information. In FIG. 1, because the microtext characters correspond to the underlying color tile pairs, the microtext characters also correspond to the first content of security information. In other words, the first content of security information and the second content of security information are the same in this case. In other aspects, however, the first content of security information and the second content of security information are different, and thus, the order of the microtext characters will not be correlated with the order of the color tiles. Similarly, the order of the microtext characters may directly correlate to the second content of security information, or the information may be encoded in the microtext order, requiring a decoding step in order to recover the content of information.

The ability to periodically alter a secure print campaign having a very high number of combinations to thwart counterfeiters can be highly useful. As described herein, the first content of security information is comprised of a plurality of symbol elements. For example, the first content of security information may be described as a string of text and the plurality of symbol elements as letters. The plurality of symbol elements may be Asian characters, ASCII characters, any type of alphanumeric characters, glyphs, or any other character set known to one skilled in the art that can be used to represent information. Each symbol element can be represented by a number of color tiles. In other words, the symbol elements that comprise the first content of security information can be encoded in the tile order of sets of color tiles. If M is the number of possible colors used as color tiles, and N is the number of symbol elements to be used, then:

$$t = \ln(N)/\ln(M)$$

where t is the number of color tiles required to encode each symbol element. This is the same as specifying $t=\min(\text{integer } x)$ such that $M^x >= N$. Note that if t is not exactly an integer in the equation $t=\ln(N)/\ln(M)$, then t should be rounded up to the next integer value. In order to provide the maximum information in a given space, it may be useful to impose a constraint that t is an integer, and thus N is an integer power of M. The following are examples of "maximum information" given the number of colors M:

1) M=6 colors; N=36 symbol elements; t=2 color tiles per symbol element.
2) M=8 colors; N=64 symbol elements; t=2 color tiles per symbol element.
3) M=5 colors; N=125 symbol elements; t=2 color tiles per symbol element.
4) M=16 colors; N=256 symbol elements; t=2 color tiles per symbol element.
5) M=16 colors; N=16 symbol elements; t=1 color tile per symbol element.

Additionally, the number of bits encoded by a plurality of color tiles in a color pattern is derived from the number of possible colors available for each color tile:

$$\# \text{ of bits encoded} = \ln(M)/\ln(2)$$

ln(2) is used in the equation because each bit can have two distinct values. For example, if a 6 color representation is used, then $\ln(6)/\ln(2)=2.585$ bits per color tile. Hence, 396.14 color tiles would be required to represent the equivalent of 1024 bits of information. If the color tiles were 1/40th of an inch on one side, then 1024 bits of information could be printed in a 0.25 square inch area.

The number of colors (M) selected for use can be based on a number of factors, including the color space used to generate the colors; the ink colors available for printing; the number of colors distinguishable when subsequent scanning and authentication are applied to the color tiles; branding, marketing, and aesthetic concerns; and of the need to change the pattern over time to increase the difficulty of counterfeiting the target item, for example.

In one aspect of the present invention, the plurality of color tiles comprises at least three color tiles that are visibly discernable from one another. It may be useful in thwarting counterfeiters to select colors having hues that are spread apart. Humans can accurately discriminate between hues, but do not perform well in determining the value of a single hue. By utilizing colors with a spread in their hues for the plurality of color tiles, a counterfeiter may have a more difficult time visually determining the original hue. For example, in a color scheme using red, blue, and yellow, a human can easily see that there is a red but may have a difficult time determining accurately which hue of red. If, on the other hand, three different reds were used, a human can compare the different reds and more easily determine their hues. In other words, color tiles can have very specific hues that can be machine verified, but those same tiles can also be human verified by comparison to other similar hues.

The plurality of color tiles can be printed in a variety of spatial configurations. In one aspect, the plurality of tiles can be printed in a one-dimensional array or, in other words, color tiles can be printed in a line where each color tiles touches, at most, two other tiles. In another aspect, the plurality of tiles can be printed in a two-dimensional array, such as in a grid. The two-dimensional grid can be any geometrical shape, including, but not limited to, square, rectangular, circular, oval, polygonal, and diamond shaped. The grid can also have nonsymmetrical or irregular borders. It would be understood to one skilled in the art that any ordered spatial configuration of the plurality of color tiles allowing authentication by human or machine would be within the scope of the present invention. Three-dimensional arrays may also be possible, such as by the use of optically-varying markers (such as holograms, lenticular printing, and other specialized printing) or other techniques currently known or to be developed in the future.

One method of thwarting counterfeiters by utilizing the large number of print combinations of the present invention may be demonstrated in the following example. A pharmaceutical company may print a unique marking on each lot of drugs manufactured for a particular shipment, with the intent that each lot be shipped to a particular pharmacy or other distributor. Because all of the drug packages in each lot are identically marked, the pharmacist can authenticate all the packages in the shipment. Drugs received without the proper markings can immediately be tagged as potential counterfeits. Transmission of the code contained in the markings to the pharmaceutical company will verify whether the shipment was a counterfeit or whether there was a shipping error. A counterfeiter would be required to obtain a sample from each lot shipped from the pharmaceutical company and have the resources to duplicate the printed markings in order to circumvent this secure printing campaign. As an additional level of security, each drug package of the lot may be printed with a unique marking, and a key to these markings may be transmitted to the pharmacist or other distributor. Each package would then be authenticated by the pharmacist to ensure its authenticity. A counterfeiter in this case would be required to obtain the entire lot of drugs in order to copy each unique marking.

Printing micro-markings onto at least a portion of the plurality of color tiles greatly increases the counterfeiting protection of the color tile system. Micro-markings are small enough to make reproduction difficult, while at the same time allowing an end user or distributor to readily authenticate the target item. While it may be difficult for an end user to authenticate the various hues in the color code, the micro-marking can be read with a magnifying glass, and thus be validated with this second half of the code. At the same time, micro-markings thwart counterfeiters because they can be printed with a LEP printer pixel by pixel, and thus are very difficult to reproduce. Thus the addition of micro-markings to the target item requires that the counterfeiter be able to reproduce both the color pattern and the micro-marking aspects of the secure printing campaign. Additionally, the use of micro-marking in a printing campaign can greatly increase the variability beyond what is provided by the color tiles alone. For example, if M*N combinations of color tiles are available, then the addition of micro-markings increases the variability to $(M*N)^T$, where T is the number of micro-markings utilized. If the number of colors used is 5, and the number of symbol elements is 64, then a 10×10 color tile pattern with micro-markings would provide $(5*64)^{100}$ different combinations.

As mentioned, the micro-markings can be any small symbol, glyph, image, marking, etc., known to one skilled in the art. In one aspect of the present invention, the micro-markings are microtext. Micro-text may include ASCII characters, alphabetic characters, numeric characters, alphanumeric characters, non-alphanumeric characters, Asian characters, punctuation symbols, or any other character or symbol known to one skilled in the art. The remainder of the specification will refer exclusively to microtext as the micro-markings printed on the color tiles. It should be noted that this is for ease of discussion, and that any form of micro-marking may be substituted for the microtext.

As discussed herein, the second content of security information is contained in the microtext. This security information can simply be printed as microtext, or it can be further encoded prior to printing so that it is not easily discernable. In this case the microtext would require decoding in order to reproduce the security information.

Microtext can be of any size that provides the security and authentication benefits of the present invention. As has been described herein, microtext characters are generally beyond the resolving power of 300 to 600 p.p.i. (pixels per inch) scanners, and are unprintable on 300 to 600 d.p.i printers. In addition to the ranges described above, microtext characters may useful in a range of from about 7 by 7 pixels to about 12 by 12 pixels at, for example, 320 dots/cm or 812.8 dpi. This range provides a sufficient pixel grid to allow variability in the pixel font while at the same time precluding optical character recognition (OCR) technologies from reading the microtext. It should be noted, however, that any size microtext small enough to preclude commercial OCR technologies from successfully reading them is considered to be within the scope of the present invention. Further variability of a microtext character set can include changes in font shape, color, etc. In addition to variability, color and font shape may be altered to make the microtext characters more or less obvious/readable when printed on the color tiles.

Microtext can be utilized in a wide variety of ways. In one aspect, at least one of the plurality of color tiles can have at least one micro-marking printed thereon. It may be useful in some cases to print a single microtext character on a single color tile for authentication and counterfeit thwarting purposes. The authentication would occur by noting that the single character was present, and counterfeiters would be thwarted due to the difficulty of spotting and reproducing a single character in a color tile grid. In another aspect, a majority of the plurality of color tiles can have micro-markings printed thereon. In yet another aspect, all of the plurality of color tiles can have micro-markings printed thereon.

Figure 2:
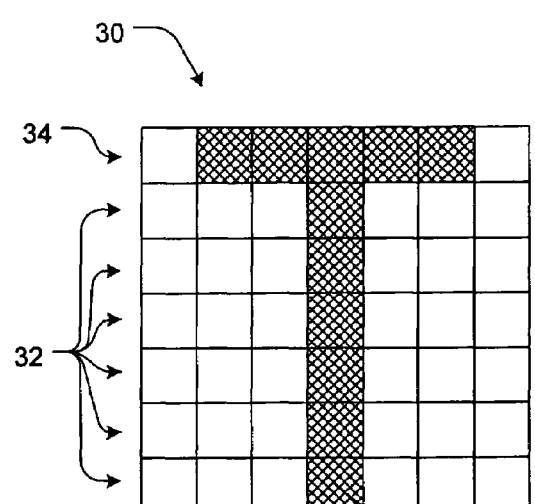
FIG. 2 is a graphical representation of a microtext symbol in accordance with another embodiment of the present invention.

One method of defining microtext characters can utilize an XML code. It should be noted that this XML code is not intended to be limiting, and any other means of defining microtext known to one skilled in the art is considered to be within the scope of the present invention. In the following code, <Yrange> counts keeps track of how many line segments are written at each row of the microtext. There are two counts for each line segment. For example, a "T" has a single line segment at each row, while a "U" has a single line segment for the first row, and two line segments for each other row (i.e., one for each side of the "U.") The <X> values mark the start and end points (in pixels) of these line segments. The microtext definitions are fully digital, and should not be scaled as in Bezier/SVG text typical of regular font families. FIG. 2 shows a 7×7 pixel grid 30 depicting a microtext character "T." Note that each row exemplified at 32 contains a single line segment comprised of a single colored pixel. One of the rows exemplified at 34 contains a single line segment comprised of 5 colored pixels. An XML definition of the character is as follows:

```
<Character Value="T">
    <Yrange Count="2"/>
    <Yrange Count="4"/>
    <Yrange Count="6"/>
    <Yrange Count="7"/>
    <Yrange Count="10"/>
    <Yrange Count="12"/>
    <Yrange Count="14"/>
    <X Value="3"/>
    <X Value="4"/>
    <X Value="3"/>
    <X Value="4"/>
    <X Value="3"/>
    <X Value="4"/>
    <X Value="3"/>
    <X Value="4"/>
    <X Value="3"/>
    <X Value="4"/>
    <X Value="3"/>
    <X Value="4"/>
    <X Value="1"/>
    <X Value="6"/>
</Character>
```

Figure 3:
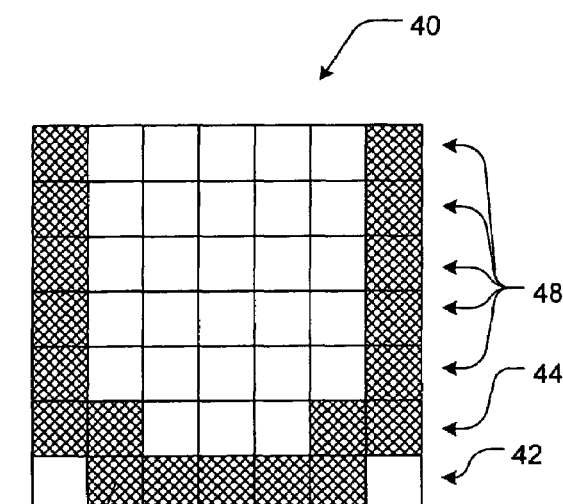
FIG. 3 is a graphical representation of an alternative microtext symbol in accordance with an embodiment of the present invention.

FIG. 3 shows a 7×7 pixel grid 40 depicting a microtext character "U." Note that the row exemplified at 42 contains a single line segment comprised of 5 colored pixels 46. The row exemplified at 44 contains two line segments comprised of two colored pixels each, and the remaining rows exemplified at 48 contain two line segments comprised of one pixel each. An XML definition of the character is as follows:

```
<Character Value="U">
    <Yrange Count="2"/>
    <Yrange Count="6"/>
    <Yrange Count="10"/>
    <Yrange Count="14"/>
    <Yrange Count="18"/>
    <Yrange Count="22"/>
    <Yrange Count="26"/>
    <X Value="1"/>
    <X Value="6"/>
    <X Value="0"/>
    <X Value="2"/>
    <X Value="5"/>
    <X Value="7"/>
    <X Value="0"/>
    <X Value="1"/>
    <X Value="6"/>
    <X Value="7"/>
    <X Value="0"/>
    <X Value="1"/>
    <X Value="6"/>
    <X Value="7"/>
    <X Value="0"/>
    <X Value="1"/>
    <X Value="6"/>
    <X Value="7"/>
    <X Value="0"/>
    <X Value="1"/>
    <X Value="6"/>
    <X Value="7"/>
    <X Value="0"/>
    <X Value="1"/>
    <X Value="6"/>
    <X Value="7"/>
</Character>
```

Interconverting from XML for a microtext character and the raster representations shown in FIGS. 2 and 3 can be implemented using the following code:

```
for (j = 0; j < height; j++)
{
    if (j ==0)
    {
        for (x = 0; x<yrange [0]; x += 2)
        {
            for (i = xarray[x]; i<xarray [x + 1]; i++)
                bitmap.SetPixel (i, height−1−j, color1);
        }
    }
    else
    {
        for (x = yrange[j − 1]; x<yrange[j]; x += 2)
        {
            for (i = xarray[x]; i<xarray [x + 1]; i++)
                bitmap.SetPixel (i, height−1−j, color1);
        }
    }
}
```

The term height-1-j is used in place of j because, for most raster renderers, the axes are not Cartesian, but rather, the y-origin is at the top.

Of course, it is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A method of authenticating a target item having a security code, comprising steps of:
    determining a first content of security information to be coded;
    determining a second content of security information to be coded;
    printing a plurality of color tiles on a target item, said plurality of color tiles defining the first content of security information; and
    printing one or more micro-markings on the target item, such that at least one micro-marking is printed on at least one of the plurality of color tiles, said one or more micro-markings defining the second content of security information.

2. The method of claim 1, wherein the first content of security information and the second content of security information are the same.

3. The method of claim 1, wherein the first content of security information and the second content of security information are different.

4. The method of claim 1, wherein the micro-markings are microtext.

5. The method of claim 1, further comprising a step of:
    establishing a key corresponding to at least one of the first content of security information and the second content of security information, the key being configured to authenticate the target item by matching the key with at least one of either the plurality of color tiles and the one or more micro-markings.

6. The method of claim 5, further comprising a step of:
authenticating the target item by matching the key to at least one of either the plurality of color tiles and the one or more micro-markings.

7. The method of claim 1, wherein the first content of security information is comprised of a plurality of symbol elements.

8. The method of claim 7, wherein at least two color tiles represent a symbol element.

9. The method of claim 1, wherein the step of printing a plurality of color tiles further includes printing the plurality of color tiles in a one-dimensional array.

10. The method of claim 1, wherein the step of printing a plurality of color tiles further includes printing the plurality of color tiles in a two-dimensional array.

11. The method of claim 1, wherein at least one of the plurality of color tiles includes a color different from at least one other of the plurality of color tiles.

12. A coded security marking, comprising:
a plurality of color tiles located on a target item;
a first content of security information defined by the plurality of color tiles;
one or more micro-markings located on the target item, such that at least one micro-marking is located on at least one of the plurality of color tiles; and
a second content of security information defined by the one or more micro-markings.

13. The coded security marking of claim 12, wherein the first content of security information and the second content of security information are the same.

14. The coded security marking of claim 12, wherein the first content of security information and the second content of security information are different.

15. The coded security marking of claim 12, wherein the micro-markings are micro-text.

16. The coded security marking of claim 15, wherein the microtext includes alphanumeric characters.

17. The coded security marking of claim 15, wherein the microtext includes non-alphanumeric characters.

18. The coded security marking of claim 12, wherein at least a majority of the color tiles have at least one micro-marking printed thereon.

19. The coded security marking of claim 12, wherein all of the color tiles have at least one micro-marking printed thereon.

20. The coded security marking of claim 12, wherein the plurality of color tiles comprises at least three color tiles that are visibly discernable from one another.

21. The coded security marking of claim 12, wherein the plurality of color tiles are divided into a plurality of sets of color tiles.

22. The coded security marking of claim 21, wherein at least one of the plurality of sets of color tiles defines at least a portion of the first content of security information.

23. The coded security marking of claim 21, wherein each of the plurality of sets of color tiles includes at least two color tiles.

24. A method of establishing a color code for secure printing, comprising steps of:
determining a desired number of symbol elements to be coded as a color code;
determining a number of colors for use in the color code based on at least the number of symbol elements;
calculating a minimum number of color tiles required to uniquely represent the number of symbol elements to be color coded; and
selecting at least the minimum number of color tiles to establish the color code.

* * * * *